US005858501A

United States Patent [19]

Malone

[11] Patent Number: 5,858,501

[45] Date of Patent: Jan. 12, 1999

[54] EVACUATED INSULATION PANEL HAVING NON-WRINKLED SURFACES

[75] Inventor: Bruce A. Malone, Midland, Mich.

[73] Assignee: The Dow Chemical Company, Midland, Mich.

[21] Appl. No.: 993,536

[22] Filed: Dec. 18, 1997

[51] Int. Cl.[6] .......... B32B 3/00

[52] U.S. Cl. .......... 428/71; 264/48; 264/424; 428/35.8; 428/304.4; 428/305.5; 428/308.4; 521/50.5; 521/146; 521/918

[58] Field of Search .......... 264/48, 424; 428/35.8, 428/71, 304.4, 305.5, 308.4; 521/50.5, 146, 918

[56] References Cited

U.S. PATENT DOCUMENTS 5,346,928 9/1994 De Vos .......... 521/166
5,627,219 5/1997 Ogawa .......... 521/134

FOREIGN PATENT DOCUMENTS 9634038 10/1996 WIPO .
9727986 8/1997 WIPO .

*Primary Examiner*—Morton Foelak
*Attorney, Agent, or Firm*—J. Robert Dean, Jr.

[57] ABSTRACT

There is an evacuated insulation panel comprising a core-stock of an open-cell alkenyl aromatic polymer foam and a deformable receptacle. The foam has an open cell content of about 70 percent or more. The foam is situated within the receptacle. The receptacle is hermetically sealed. The open-cells of the foam and the interior of the receptacle are evacuated to an absolute pressure of about 10 torr or less. The foam has indentations therein which extend in two dimensions across a surface of the foam. The receptacle substantially conforms to the shape of the foam, including the indentations within. The panel has one or more surfaces which are substantially non-wrinkled. Further disclosed is a method for making the panel.

9 Claims, 2 Drawing Sheets

EVACUATED INSULATION PANEL HAVING NON-WRINKLED SURFACES

BACKGROUND OF THE INVENTION

This invention relates to an evacuated insulation panel having a corestock of an open-cell alkenyl aromatic polymer foam. The foam has indentations therein to provide a panel having aesthetically desirable, non-wrinkled surfaces.

To significantly improve the performance of insulating systems, evacuated or vacuum panel technology is currently being evaluated by industry. The removal of substantial amounts of air or gas in the panels affords the possibility of superior insulating performance.

A useful evacuated panel is one employing a panel corestock of a rigid open-cell alkenyl aromatic polymer foam. The open-cell structure of the foam allows rapid and substantially complete withdrawal of gases from within the foam and the panel containing it. The rigid foam matrix provides a corestock of substantial mechanical strength and insulating performance.

A problem with employing panel corestocks of open-cell alkenyl aromatic polymer foams is their tendency to shrink upon being evacuated and/or being exposed to elevated temperatures. The shrinking may result in a wrinkled surface appearance for the receptacle or enclosure maintaining a hermetic seal in the panel.

It would be desirable to have an evacuated insulation panel with a corestock of an open-cell alkenyl aromatic polymer foam. A surface or surfaces of the panel would exhibit an aesthetically desirable, relatively smooth and homogeneous surface substantially free of wrinkles or ridges. It would be desirable to produce panels having a substantially flat surface so that the insulating panel can be placed or situated flush or adjacent to flat, smooth surfaces such as the inside of a refrigerator wall.

SUMMARY OF THE INVENTION

According to the present invention, there is an evacuated insulation panel comprising a corestock of an open-cell alkenyl aromatic polymer foam and a deformable receptacle. The foam comprises an alkenyl aromatic polymer material comprising greater than 50 weight percent of alkenyl aromatic polymer units based upon the total weight of the alkenyl aromatic polymer material. The foam has an open-cell content of about 70 percent or more. The receptacle is capable of receiving the foam and being hermetically sealed. The foam is situated within the receptacle. The receptacle is hermetically sealed. The open cell of the foam and the interior of the receptacle are evacuated to an absolute pressure of about 10 torr or less. The foam has indentations therein which extend in two dimensions across a surface of the foam. The receptacle substantially conforms to the shape of the foam and the indentations therein. The panel has surfaces which are substantially non-wrinkled.

Further according to the present invention, there is a method of making an evacuated insulation panel having a substantially non-wrinkled surface. The method comprises: a) providing a corestock of an open-cell alkenyl aromatic polymer foam comprising an alkenyl aromatic polymer material, b) indenting one or more surfaces of the foam: c) providing a deformable receptacle capable of receiving and retaining the corestock; d) placing the corestock within the receptacle; e) evacuating the open-cells of the foam and the interior of the receptacle to an absolute pressure of 10 torr or less; f) hermetically sealing the receptacle to form the panel; and g) allowing the foam to shrink and the receptacle to conform substantially within the indentations. The alkenyl aromatic polymer material comprises greater than 50 weight percent of alkenyl aromatic polymer units based upon the total weight of the alkenyl aromatic polymer material. The foam has about 70 percent or more open-cell content.

Further according to the present invention, there is an evacuated insulation panel. The panel comprises a) a corestock of an open-cell alkenyl aromatic polymer foam, b) one or more rigid plates, and c) a deformable receptacle. The foam comprises an alkenyl aromatic polymer material comprising greater than 50 weight percent of alkenyl aromatic monomeric units based upon the total weight of the alkenyl aromatic polymer material. The foam has an open-cell content of about 70 percent or more. The plate is situated contiguous to a major surface of the foam. The receptacle is capable of receiving the foam and the plate and being hermetically sealed. The foam and the plate are situated within the receptacle. The open-cells of the foam and the interior of the receptacle are evacuated to an absolute pressure of about 10 torr or less. The plate has one or more indentations therein which extend in two dimensions across the surface of the plate. The receptacle substantially conforms to the shape of the foam and the indentations within the plates.

DETAILED DESCRIPTION OF THE INVENTION

The present invention addresses the problem of wrinkling of a surface or surfaces of an evacuated insulation panel having a corestock of an open-cell, alkenyl aromatic polymer foam therein by providing a foam having indentations therein. When the foam shrinks upon evacuation and/or exposure to elevated temperatures, the deformable receptacle or enclosure surrounding the foam deforms to the shrunken foam. The indentations provide extra surface area for the receptacle to deform or conform within. Without the indentations, wrinkles would form in the receptacle upon shrinkage of the foam. The invention significantly improves the aesthetics and physical appearance of the panel.

Indentations in a surface or surfaces of the foam may take a variety of forms such as dimples, grooves, or troughs. The indentations may take a regular or irregular pattern across a surface. Indentations may traverse or extend across the surface continuously or non-continuously. The indentations extend in two dimensions across a surface or surfaces of the foam. The indentations preferably extend generally from one edge of the foam to another. If the indentations are in the form of dimples, they preferably occur at regular intervals across substantially an entire surface or surfaces of the foam. If the indentations are in the form of grooves or troughs, they preferably criss-cross as they traverse or extend across the surface.

Preferably, indentations are provided at an incidence and at a depth such that the deformable receptacle will rest upon the surfaces of the foam and the indentations within upon shrinkage of the foam and that the surfaces of the receptacle are substantially free of wrinkles. In other words, the additional foam surface area provided by the indentations after shrinkage of the foam preferably approximately corresponds to the total surface area of the foam anticipated to be lost due to shrinkage. Indentations may be to any depth or width within the foam but preferably have a depth of about ⅛ inch (3.2 millimeters) or less and a width of about ⅛ inch (3.2 millimeters) or less.

Indentations may be impressed into the foam by any means known in the art such as the following: a) passing the foam through a set of opposing impressing rollers having the desired groove pattern as raised ridges in the rollers; b) impressing with opposing plates having the desired groove pattern as raised ridges in the plates; c) impressing the desired pattern with a series of wires positioned adjacent the foam; d) cutting the desired pattern into the foam using knives, saws, routers, or water spray; and e) melting the desired pattern into the foam with hot wires or other heat source. In the case of a) and b), momentary impression by the raised ridges is usually sufficient to leave permanent indentations, although impression for longer periods of time may be desirable if the foam is being compressed for other reasons.

Figure 1:
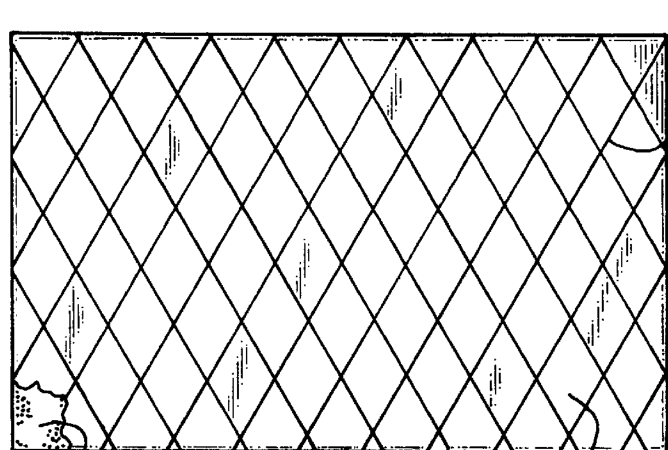
FIG. 1 is a plan view showing an embodiment of an evacuated insulation panel according to the present invention. The panel has a foam corestock defining diagonally-disposed grooves therein traversing continuously across its dimensions. The foam corestock is shown in cutaway at the bottom left of the figure.
Figure 3B:
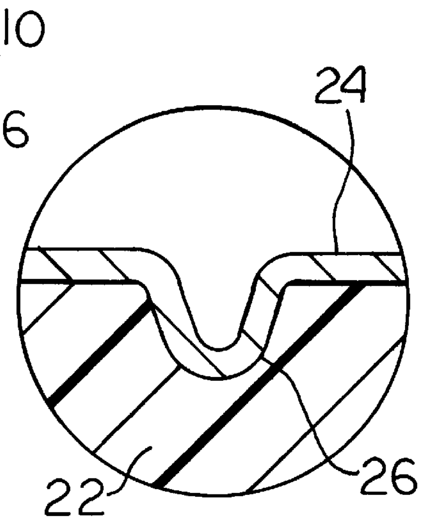
FIG. 3B is an enlarged, cutaway, cross-sectional view of the panel of FIG. 2 from FIG. 3A.
Figure 2:
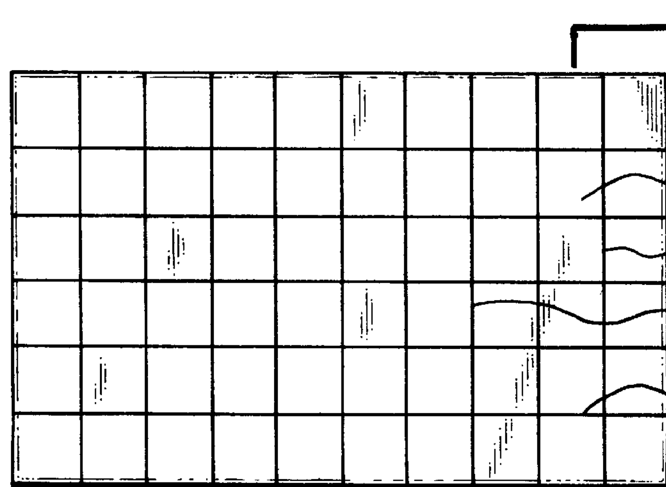
FIG. 2 is a plan view showing an embodiment of an evacuated insulation panel according to the present invention. The panel has a foam corestock (not shown) defining grooves therein in a rectangular grid traversing continuously across its dimensions.
Figure 3A:
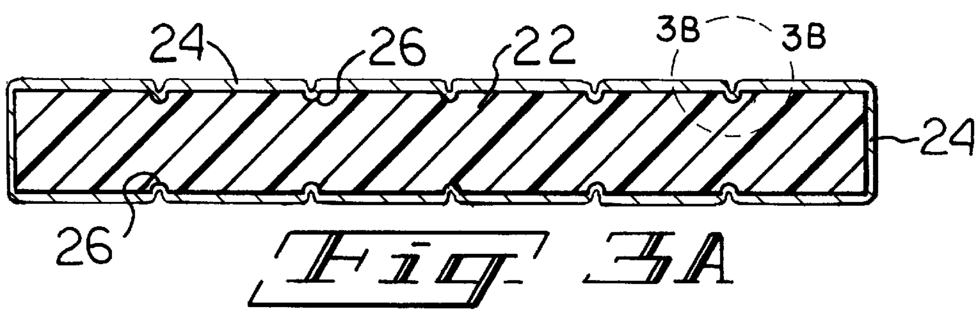
FIG. 3A is a enlarged, cross-sectional view of the panel of FIG. 2 along Line 3A—3A. The foam corestock of the panel is shown.

FIGS. 1 and 2 show two embodiments of the present invention. In FIG. 1, panel 10 comprises a foam 12 and a receptacle 14. Grooves 16 are impressed within foam 12 and traverse it continuously in a diagonal or criss-cross pattern. Grooves 16 extend in two dimensions (length and width) substantially across foam 12. In FIG. 2, panel 20 comprises a foam 22 and a receptacle 24. Grooves 26 are impressed within foam 22 and traverse it continuously in a criss-crossing rectangular pattern or grid. Receptacle 24 conforms substantially to the shape of foam 22 and rests substantially within grooves 26 as shown in FIG. 3A and FIG. 3B. Grooves 26 extend in two dimensions (length and width) substantially across foam 22. Panels 10 and 20 each have a substantially non-wrinkled appearance.

Figure 4:
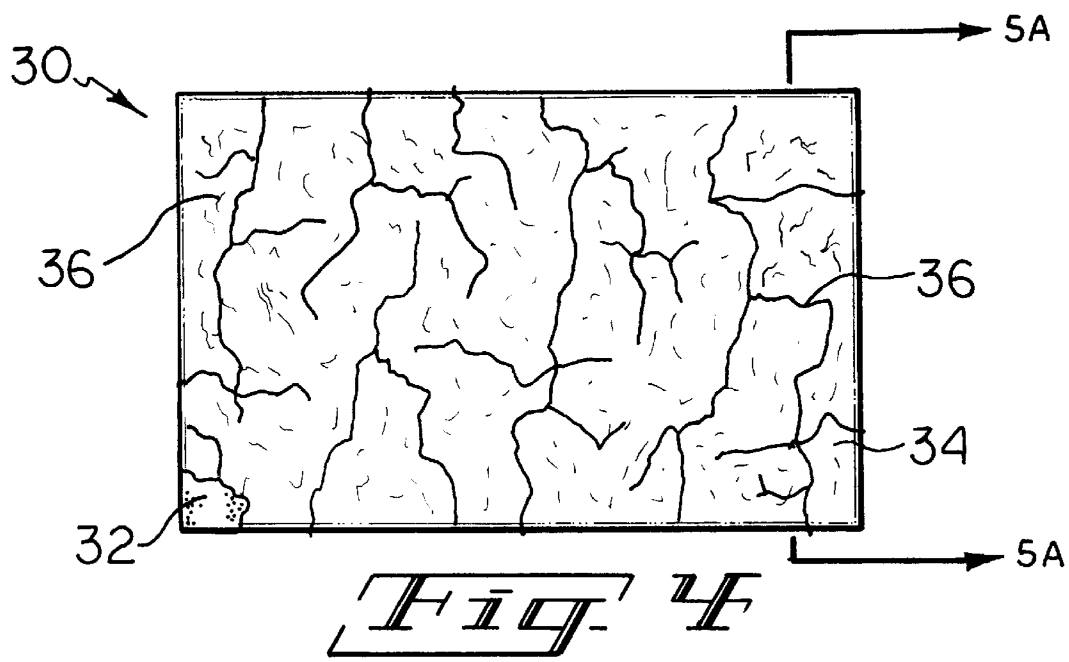
FIG. 4 is a plan view of an evacuated insulation panel not in accordance with the present invention. The panel has a substantially wrinkled surface. A foam corestock is shown in cutaway at the bottom left of the figure.
Figure 5A:
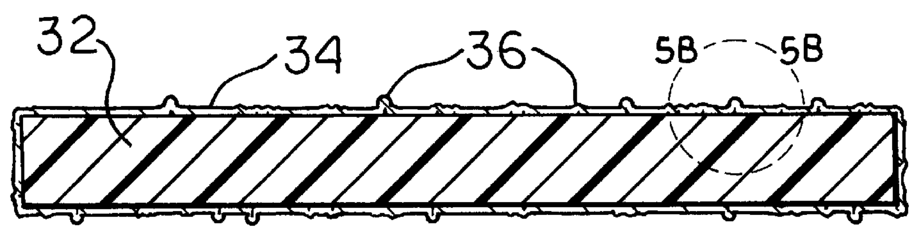
FIG. 5A is an enlarged, cross-sectional view of the panel of FIG. 4.
Figure 5B:
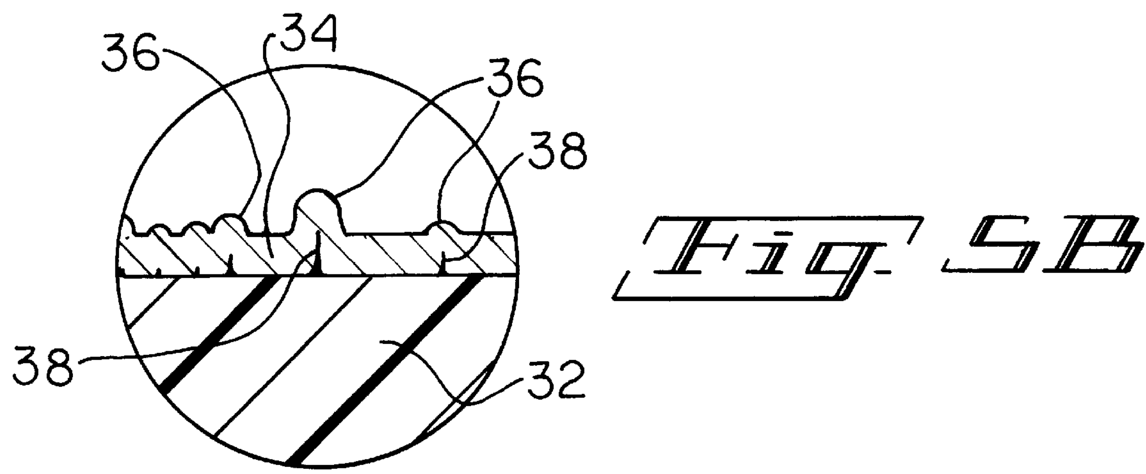
FIG. 5B is an enlarged, cutaway, cross-sectional view of the panel of FIG. 4 from FIG. 5A.

FIG. 4 shows a panel 30 not in accordance with the present invention. Panel 30 comprises a foam 32 and a receptacle 34. Receptacle 34 has wrinkles 36 therein. Receptacle 34 does not conform to the shape of foam 32. The raised configuration of wrinkles 36 is shown in FIGS. 5A and 5B. If a given wrinkle 36 is large enough, it may define an evacuated cavity 38 underneath it above foam 32.

Prior to incorporation in an evacuated panel, a foam may, optionally, be compressed to increase insulating capability on a per unit thickness basis as taught in WO 97/27986, which is incorporated herein by reference. This reference teaches that foams are desirably compressed to about 30 to about 90 percent, preferably from about 40 to about 70 percent, and more preferably 50 to about 60 percent of their initial (original) thickness or volume prior to compression. Desired compression levels vary as function of polymer identity, foam physical properties, level of evacuation, and desired insulating performance.

Compression to increase insulating capability on a per unit thickness basis may be accomplished by any means known in the art such as between opposing, moveable parallel plates, between a moveable plate and a stationary plate or surface, or opposing rollers or belts. Compression may be applied in one step or in multiple steps in sequence. When compression occurs in multiple steps, it is preferable to allow the foam to relax between compression steps by removing the source of compression.

The foam may, optionally, also be compressed to impart dimensional stability. The foam is compressed and simultaneously heated for a period of time sufficient to render the foam dimensionally stable. Such compression and heating to impart dimensional stability is taught in Provisional APPL. No. Ser. No. 60/052,408 filed Jul. 14, 1997, which is incorporated herein by reference.

Compression to impart dimensional stability must be substantially maintained at a desired level for a period of time. Typically, such compression will be carried out by opposing parallel plates or belts positioned to press together opposing, major surfaces of a foam. The degree of compression required to impart dimensional stability can be as little as about 5 percent to about 10 percent of initial thickness or volume prior to compression. In a preferred process, compression and heating to impart dimensional stability is carried out simultaneously indentation of a surface or surfaces of the foam. The foam is compressed by opposing parallel plates having raised surfaces corresponding to the desired indentation pattern. The foam is heated and compressed simultaneously for a period of time sufficient to impart dimensional stability and indentations to the foam. The time period will depend upon foam composition and physical properties, extent of compression, and exposure temperature. The period of time may be as little as a few moments, but will typically be about one minute or more. About one to ten minutes is most typical.

The heating step is carried out or effected by heating an open-cell alkenyl aromatic polymer foam and maintaining it at a temperature for a time sufficient (in conjunction with the compression step) to impart dimensional stability to the foam. The temperature required will vary according to polymer physical properties and foam composition, but will typically be within about 10°–20° C. (less than) of the glass transition temperature. For polystyrene resins of the type commonly employed in foams, typical glass transition temperatures range from about 100° C.–110° C. Suitable exposure (heating) temperatures for polystyrene foams will typically range from about 85° C. to about 110° C. The temperature profile within the foam may be uniform or non-uniform throughout; the temperature profile may be non-uniform so long as the temperature is at a sufficient level at both the exterior and interior portions of the foam to impart the desired dimensional stability (in conjunction with the compression step).

The foam may be evacuated by any means known in the art for withdrawing gases such as with a suction nozzle or by placement in an evacuated chamber. Hermetic sealing of the deformable receptacle typically takes place after the desired level of evacuation has been achieved. To reduce the time required to evacuate, the skin layer of the foam is preferably removed by planing or skiving to obtain maximum open-cell surface exposure area.

The foam has an open cell content of about 70 percent or more, preferably about 90 percent or more, and most preferably about 95 percent or more prior to compression according to ASTM D2856-A. The foam is preferably as close as possible to complete or 100 percent open-cell. The open cell content after compression, if any, will be equal to or greater than the open cell content prior to or before compression.

The panel and the open cells of the foam are evacuated to a partial vacuum or near total vacuum of subatmospheric absolute pressure. The foam is evacuated to an absolute pressure of about 10 torr or less, more preferably about 1 torr or less, and most preferably about 0.1 torr or less in its open cells.

The foam (prior to compression, if any) has a density of about 16 to about 150 kg/m$^3$ and most preferably about 25 to about 60 kg/m$^3$ according to ASTM D-1622-88. Foam density will increase proportionately with compression.

The insulation panel may be formed from a foam of any desired size, shape, thickness, or dimension. Panels are most commonly formed from foams which are square or rectangular in width and length. Plank foams and sheet foams are useful. Thicknesses of about ⅛ inch (3.2 millimeters) to about 2 inches (50.8 millimeters) are most common, but thicknesses outside that range are possible. Other possible shapes include L-shaped foams and block-shaped foams useful in corners. The panel most commonly comprises a single layer or piece of foam but may comprise two or more adjacent or stacked layers or pieces.

The panel preferably contains an infrared attenuating agent (IAA) to enhance its insulating performance. The IAA is preferably dispersed in the foam but could be dispersed in one or more film layers attached to the foam or part of the receptacle as a part of a laminate. The IAA is composed of a different substance than the polymer substrate of the foam in which it is incorporated. The IAA may absorb and/or reflect infrared radiation. Useful IAA include particulate flakes of metals such as aluminum, silver, and gold; titanium dioxide; and carbonaceous substances such as carbon black, activated carbon black and graphite. Useful carbon blacks include thermal black, furnace black, acetylene black, and channel black. Preferred IAA are thermal black and graphite. The IAA preferably comprises between about 1.0 and about 25 weight percent and preferably between about 2.0 and about 20 weight percent and most preferably about 3.0 to about 10 weight percent based upon the weight of the polymer material.

Various additives may be incorporated in the foam such as inorganic fillers, pigments, antioxidants, acid scavengers, ultraviolet absorbers, flame retardants, processing aids, extrusion aids, and the like.

The panel may be used to insulate a surface by applying it to the surface. Such panels are useful in any conventional insulating applications such as roofing, building and construction panels, refrigerators, freezers, controlled temperature rooms, controlled temperature shipping containers and packages, water heaters, refrigerated trucks and rooms, etc.

A substantially wrinkle-free insulation panel may be formed as according to the following: a) providing a corestock of an open cell alkenyl aromatic polymer foam comprising an alkenyl aromatic polymer material, b) indenting one or more surfaces of the foam: c) providing a deformable receptacle capable of receiving and retaining the foam; d) placing the foam within the receptacle; e) evacuating the open cells of the foam and the interior of the receptacle; f) hermetically sealing the receptacle to form the panel; and g) allowing the foam to shrink and the receptacle to conform substantially within the indentations. The the open cells and the interior of the panel is evacuated to about 10 torr or less, more preferably to about 1 torr or less, and most preferably to about 0.1 torr or less absolute pressure.

The receptacle or enclosure of the evacuated panel may be formed of any of those known in the art. One embodiment of an evacuated panel employs a receptacle or enclosure formed of a laminate sheet of three or more layers. The outer layer comprises a scratch resistant material such as a polyester or a nylon. An interior layer or layers comprise a barrier material such as aluminum, polyvinylidine chloride, or polyvinyl alcohol. The barrier material may be in the form of a separately applied foil or film or, in the case of a metal, may be applied by vapor deposition The inner layer comprises a heat sealable material such as polyethylene or ethylene/acrylic acid copolymer. Additional teachings are seen in U.S. Pat. No. 5,346,928 and 5,627,219, which is incorporated herein by reference.

To further enhance the long-term performance of the vacuum panel, the evacuated interior of the panel may be provided with a "getter" material. The getter material adsorbs gases and/or vapors which seep or permeate into the vacuum panel over time. Conventional getter materials include metal and metal alloys of barium, aluminum, magnesium, calcium, iron, nickel, and vanadium. Teachings to suitable getter materials include but are not limited to those set forth in U.S. Pat. Nos. 5,191,980; 5,312,606; 5,312,607; and WO 93/25843, which are incorporated herein by reference.

Other types of useful getter materials include conventional desiccants, which are useful for absorbing water vapor or moisture. Such materials are advantageously incorporated into the evacuated insulation panel in the form of a packet having a porous or permeable wrapper or receptacle containing the material therein. Useful materials include silica gel, activated alumina, aluminum-rich zeolites, calcium chloride, calcium oxide, and calcium sulfate. A preferred material is calcium oxide.

Open-cell foams of virtually any average cell size can be employed in the present invention, but it is preferable to use a foam with an average cell size as small as possible to minimize foam thermal conductivity. Preferred foams are microcellular and have an average cell size of about 70 micrometers or less, more preferably about 30 micrometers or less, and most preferably about 10 micrometers or less according to ASTM D3576-77. The cell size or pore size (diameter) for the microcellular foams is determined according to ASTM D3576-77 except that measurement is taken from an enlarged photograph obtained by scanning electron microscopy instead of measurement taken directly from the foam.

The foam can be formed from any thermoplastic polymer resin which exhibits relatively high modulus and is capable of being blown into a foam. Preferred resins include those exhibiting a modulus of greater than 30,000 pounds per square inch (206,850 kilopascals) according to ASTM D695. Also useful are thermoset polymer foams such as polyurethane foams which exhibit some degree of shrinkage upon evacuation and/or exposure to heat or high temperature.

A preferred foam is an extruded alkenyl aromatic polymer foam. Extruded alkenyl aromatic polymer foams are generally prepared by heating a polymer material to form a plasticized or melt polymer material, incorporating therein a blowing agent to form a formable gel, and extruding the gel through a die to form the foam product. Prior to mixing with the blowing agent, the polymer material is heated to a temperature at or above its glass transition temperature or melting point. The blowing agent may be incorporated or mixed into the melt polymer material by any means known in the art such as with an extruder, mixer, blender, or the like. The blowing agent is mixed with the melt polymer material at an elevated pressure sufficient to prevent substantial expansion of the melt polymer material and to generally disperse the blowing agent homogeneously therein. A nucleating agent additive may be blended in the polymer melt or dry blended with the polymer material prior to plasticizing or melting. The formable gel is typically cooled to a lower temperature to optimize or attain desired physical characteristics of the foam. The gel may be cooled in the extruder or other mixing device or in separate coolers. The gel is then extruded or conveyed through a die of desired shape to a zone of reduced or lower pressure to expand to form the foam. The zone of lower pressure is at a pressure lower than that in which the foamable gel is maintained prior to extrusion through the die. The lower pressure may be superatmospheric, subatmospheric (evacuated or vacuum), or atmospheric level.

Most preferred microcellular foams are extruded, microcellular alkenyl aromatic polymer foams. They are preferred because it is possible to make such foams to a relatively small average cell size, such as about 70 micrometers or less. Extruded, open-cell microcellular alkenyl aromatic polymer foams having an open cell content of about 70 percent or more and an average cell size of about 70 micrometers or less may be made by the following process: a) heating an alkenyl aromatic polymer material to form a melt polymer material; b) incorporating into the melt polymer material a nucleating agent additive at from about 0.1 to about 5 parts by weight per hundred parts polymer material; c) incorporating into the melt polymer material at an elevated pressure to form a foamable gel a blowing agent of which about 50 mole percent or more and preferably about 70 mole percent or more is selected from the group consisting of 1,1-difluoroethane (HFC-152a), 1,1,1-trifluoroethane (HFC-143a), 1,1,1,2-tetrafluoro-ethane (HFC-134a), chlorodifluoromethane (HCFC-22), carbon dioxide (CO2), and difluoromethane (HFC-32), and mixtures of the foregoing based upon the total number of moles of blowing agent, the blowing agent being present at about 0.06 to about 0.17 gram-moles or less and preferably about 0.08 to about 0.12 gram-moles or less per kilogram of polymer material; d) cooling the foamable gel to a foaming temperature sufficient to form a foam having about 70 percent or more open cell content; and e) extruding the formable gel through a die into a region of lower pressure to form the foam. Preferred foaming temperatures will vary from about 118° C. to about 150° C. and preferably about 125° C. to about 135° C. depending upon foaming-forming compositions and process conditions. Additional teachings to microcellular foams are seen in WO 96/34038, which is incorporated herein by reference.

Suitable alkenyl aromatic polymer materials include alkenyl aromatic homopolymers and copolymers of alkenyl aromatic compounds and copolymerizable ethylenically unsaturated comonomers. The alkenyl aromatic polymer material may further include minor proportions of non-alkenyl aromatic polymers. The alkenyl aromatic polymer material may be comprised solely of one or more alkenyl aromatic homopolymers, one or more alkenyl aromatic copolymers, a blend of one or more of each of alkenyl aromatic homopolymers and copolymers, or blends of any of the foregoing with a non-alkenyl aromatic polymer. Regardless of composition, the alkenyl aromatic polymer material comprises greater than 50 and preferably about 70 percent or more by weight alkenyl aromatic monomeric units. Most preferably, the alkenyl aromatic polymer material is comprised entirely of alkenyl aromatic monomeric units.

Suitable alkenyl aromatic polymers include those derived from alkenyl aromatic compounds such as styrene, alphamethylstyrene, ethylstyrene, vinyl benzene, vinyl toluene, chlorostyrene, and bromostyrene. A preferred alkenyl aromatic polymer is polystyrene. Minor amounts of monoethylenically unsaturated compounds such as $C_{2-6}$ alkyl acids and esters, ionomeric derivatives, and $C_{4-6}$ dienes may be copolymerized with alkenyl aromatic compounds. Examples of copolymerizable compounds include acrylic acid, methacrylic acid, ethacrylic acid, maleic acid, itaconic acid, acrylonitrile, maleic anhydride, methyl acrylate, ethyl acrylate, isobutyl acrylate, n-butyl acrylate, methyl methacrylate, vinyl acetate and butadiene. Preferred foams comprises substantially (i.e., about 90 percent or more, preferably about 95 percent or more by weight and most preferably entirely of polystyrene.

It is contemplated that the present invention could be practiced by placing a rigid plate having indentations therein at one or more surfaces of a foam within an evacuated insulation panel. The indentations could take the form, pattern, and dimensions as described above for indentations within the foam. The panel could be assembled as described above except that one or more plates are inserted within the deformable receptacle along with the foam. For a typical rectangular or square panel, plates will typically be situated at the two major surfaces of the foam. Upon evacuation of the panel and shrinkage of the foam, the deformable receptacle will conform to the shape of the foam and rest substantially within the indentations of the plate or plates.

While embodiments of the foam, evacuated insulation panel, and method of the present invention have been shown with regard to specific details, it will be appreciated that depending upon the manufacturing process and the manufacturer's desires, the present invention may be modified by various changes while still being fairly within the scope of the novel teachings and principles herein set forth.

What is claimed is:

1. An evacuated insulation panel, the panel comprising a corestock of an open-cell alkenyl aromatic polymer foam and a deformable receptacle, the foam comprising an alkenyl aromatic polymer material comprising greater than 50 weight percent of alkenyl aromatic monomeric units based upon the total weight of the alkenyl aromatic polymer material, the foam having an open cell content of about 70 percent or more, the receptacle being capable of receiving the foam and being hermetically sealed, the foam being situated within the receptacle, the receptacle being hermetically sealed, the open cells of the foam and the interior of the receptacle being evacuated to an absolute pressure of about 10 torr or less, the foam having indentations therein extending in two dimensions across a surface of the foam, the receptacle substantially conforming to the shape of the foam and the indentations therein.

2. The panel of claim 1, wherein the foam has indentations therein in a criss-crossing rectangular or diagonal pattern across substantially the entire surface of the foam.

3. The panel of claim 1, wherein the foam has indentations therein in a dimple pattern across substantially the entire surface of the foam.

4. The panel of claim 1, wherein the indentations are about 3.2 millimeters or less in depth and about 3.2 millimeters or less across.

5. The panel of claim 1, wherein the foam comprises an alkenyl aromatic polymer material comprising about 70 weight percent or more of alkenyl aromatic monomeric units based upon the total weight of the alkenyl aromatic polymer material, the foam having an open-cell content of about 90 percent or more, the open-cells of the foam and the interior of the receptacle being evacuated to an absolute pressure of about 1 torr or less, the foam having a density of about 16 to about 150 kilograms per cubic centimeter, the foam having an average cell size of about 70 micrometers or less.

6. The panel of claim 1, wherein the foam comprises an alkenyl aromatic polymer material comprising about 70 weight percent or more of alkenyl aromatic monomeric units based upon the total weight of the alkenyl aromatic polymer material, the alkenyl aromatic polymer material comprising polystyrene, the foam having an open-cell content of about 95 percent or more, the open-cells of the foam and the interior of the receptacle being evacuated to an absolute pressure of about 0.1 torr or less, the foam having a density of about 25 to about 60 kilograms per cubic centimeter, the foam having an average cell size of about 30 micrometers or less.

7. An evacuated insulation panel, the panel comprising; a) a corestock of an open-cell alkenyl aromatic polymer foam, b) one or more rigid plates, and c) a deformable receptacle, the foam comprising an alkenyl aromatic polymer material comprising greater than 50 weight percent of alkenyl aromatic monomeric units based upon the total weight of the alkenyl aromatic polymer material, the foam having an open-cell content of about 70 percent or more, the plate being situated contiguous to a major surface of the foam, the receptacle being capable of receiving the foam and the plate and being hermetically sealed, the foam and the plate being situated within the receptacle, the receptacle being hermetically sealed, the open-cells of the foam and the interior of the receptacle being evacuated to an absolute pressure of about 10 torr or less, the plate having one or more indentations therein, the receptacle substantially conforming to the shape of the foam and the indentations within the plates.

8. The foam of claim 6, wherein the foam has indentations therein in a criss-crossing rectangular or diagonal pattern across substantially the entire surface of the foam, the indentations being about 3.2 millimeters or less in depth and about 3.2 millimeters or less across.

9. The foam of claim 6, wherein the foam has indentations therein in a dimple pattern across substantially the entire surface of the foam, the indentations being about 3.2 millimeters or less in depth and about 3.2 millimeters or less across.

* * * * *